US007548872B2

(12) United States Patent
Keay et al.

(10) Patent No.: US 7,548,872 B2
(45) Date of Patent: *Jun. 16, 2009

(54) SIMULATION OF BUSINESS TRANSFORMATION OUTSOURCING OF SOURCING, PROCUREMENT AND PAYABLES

(75) Inventors: Les Keay, Richmond Hill (CA); Craig Alan Keenan, Naperville, IL (US); John Arthur Ricketts, Clarendon Hills, IL (US); William Stephen Schaefer, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 1075 days.

This patent is subject to a terminal disclaimer.

(21) Appl. No.: 10/666,868

(22) Filed: Sep. 18, 2003

(65) Prior Publication Data

US 2005/0065831 A1    Mar. 24, 2005

(51) Int. Cl.
  *G05B 19/418* (2006.01)
(52) U.S. Cl. .......................................................... 705/8
(58) Field of Classification Search ........................ None
  See application file for complete search history.

(56) References Cited

U.S. PATENT DOCUMENTS

| 5,287,267 | A |   | 2/1994  | Jayaraman et al.        |
| 5,361,199 | A |   | 11/1994 | Shoquist et al.         |
| 5,416,694 | A |   | 5/1995  | Parrish et al.          |
| 5,734,828 | A |   | 3/1998  | Pendse et al.           |
| 5,887,154 | A | * | 3/1999  | Iwasa et al. ...... 703/6 |
| 5,970,465 | A |   | 10/1999 | Dietrich et al.         |
| 6,119,103 | A |   | 9/2000  | Basch et al.            |
| 6,301,574 | B1 |  | 10/2001 | Thomas et al.           |
| 6,505,176 | B2 |  | 1/2003  | DeFrancesco, Jr. et al. |
| 6,684,191 | B1 | * | 1/2004 | Barnard et al. .................. 705/7 |
| 7,020,621 | B1 | * | 3/2006 | Feria et al. ..................... 705/10 |
| 7,076,474 | B2 | * | 7/2006 | Jin et al. ........................ 706/45 |
| 7,165,036 | B2 | * | 1/2007 | Kruk et al. ...................... 705/1 |
| 2001/0053991 | A1 | * | 12/2001 | Bonabeau ................... 705/7 |
| 2002/0042751 | A1 | * | 4/2002  | Sarno ......................... 705/26 |
| 2002/0069102 | A1 | * | 6/2002  | Vellante et al. ............. 705/10 |
| 2003/0033182 | A1 | * | 2/2003  | Stok et al. .................... 705/7 |
| 2003/0120528 | A1 | * | 6/2003  | Kruk et al. .................... 705/7 |

(Continued)

FOREIGN PATENT DOCUMENTS

WO    WO 03/056406 A2 *    7/2003

OTHER PUBLICATIONS

Ngwenyyama, Ojelanki K. et al., Making the information systems outsourcing decision: A transaction cost approach to analyzing outsourcing decision problems, European Journal of Operational Research, vol. 115, 1999, pp. 351-367.*

(Continued)

*Primary Examiner*—Scott L Jarrett
(74) *Attorney, Agent, or Firm*—Steven J. Walder, Jr.; David A. Mims, Jr.

(57) ABSTRACT

An example of a solution provided here comprises: performing a spending simulation, process simulation, information technology simulation, and value simulation, providing interactions among the simulations, and representing with the simulations the use by a client organization of one or more business transformation outsourcing services, such as sourcing, procurement, and payables.

13 Claims, 7 Drawing Sheets

U.S. PATENT DOCUMENTS

| | | | |
|---|---|---|---|
| 2003/0144953 A1* | 7/2003 | Razum et al. | 705/40 |
| 2003/0177060 A1* | 9/2003 | Seagraves | 705/11 |
| 2003/0187707 A1* | 10/2003 | Hack et al. | 705/7 |
| 2003/0212643 A1* | 11/2003 | Steele et al. | 705/400 |
| 2004/0039619 A1* | 2/2004 | Zarb | 705/7 |
| 2004/0044551 A1* | 3/2004 | Keefe et al. | 705/7 |
| 2004/0068431 A1* | 4/2004 | Smith et al. | 705/10 |
| 2004/0148209 A1* | 7/2004 | Church et al. | 705/7 |
| 2004/0162763 A1* | 8/2004 | Hoskin et al. | 705/26 |
| 2004/0210463 A1* | 10/2004 | Reid | 705/7 |
| 2004/0225549 A1* | 11/2004 | Parker et al. | 705/8 |
| 2005/0049911 A1* | 3/2005 | Engelking et al. | 705/11 |
| 2005/0060224 A1 | 3/2005 | Ricketts | |
| 2005/0065841 A1* | 3/2005 | Middleton | 705/11 |

OTHER PUBLICATIONS

Remenyi, Dan et al., Outcomes and Benefits Modeling for Information Systems Investments The International Journal of Flexible Manufacturing Systems, vol. 13, 2001, pp. 105-129.*

Techopiitayakul, Darchia et al., ASP-based Software Delivery: a Real Option Analysis 5th Annual Real Options Conference, 2001.*

Remenyi, Dan et al., The Effective Measurement and Management of IT Costs and Benefits ComputerWeekly Professional Series, 2000, ISBN 0-7506-4420-6.*

Linder, Janice C. et al., Business transformation through outsourcing Strategy & Leadership, vol. 30, No. 4, 2002.*

Toscano, Lawrence et al., Business Transformation Outsourcing Public Utilies Fortnightly, vol. 4, No. 2, 2003.*

Ellram, Lisa M. et al., The Use of Total Cost of Ownership Concepts to Model the Outsourcing Decision The International Journal of Logistics Management, vol. 6, No. 2, 1995.*

Bradley P. et al., Business process re-engineering (BPR)—A study of the software tools currently available Computers In Industry, Vo. 25, 1995.*

Kim, Hee-Wong et al., Dynamic process modeling of BPR: A computerized simulation approach Information & Management, vol. 32, 1997.*

Yang, Chyan, et al., A decision model for IS outsourcing International Journal of Information Management, vol. 20, 2000.*

King, William R. et al., Developing a framework for analyzing IS sourcing INformation & Management, vol. 37, 2000.*

Raffy, Ardhaldjian et al., Using Simulation In the Business Process Reengineering Effort Industrial Engineering, vol. 26, No. 7, Jul. 1994.*

Nembhard, Harriet Black et al., A Real Options Design For Product Outsourcing The Engineering Economist, vol. 48 No. 3, 2003.*

Bosilj-Vuksic, Vesna et al., Assessment of E-Business Transformation Using Simulation Modeling Simulation, vol. 78, No. 12, Dec. 2002.*

Greasley, Andrew, Using business-process simulation within a business-process reengineering approach Business Process Management Journal, vol. 9, No. 4, 2003.*

Ngwenyama, Ojelanki K. et al., Making the information systems outsourcing decision: A transaction cost approach to analyzing outsourcing deciision problems, European Journal of Operational Research, vol. 115. 1999.*

* cited by examiner

SIMULATION OF BUSINESS TRANSFORMATION OUTSOURCING OF SOURCING, PROCUREMENT AND PAYABLES

CROSS-REFERENCES TO RELATED APPLICATIONS, AND COPYRIGHT NOTICE

The present patent application is related to a co-pending patent application entitled Simulation of Business Transformation Outsourcing, filed on even date herewith. This co-pending application is assigned to the assignee of the present application, and herein incorporated by reference. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to computer modeling or simulation, and more particularly to methods and systems of simulation of complex services.

BACKGROUND OF THE INVENTION

Organizations who will pay for receiving complex services, need to estimate the costs and benefits of (i.e. the "business case" for) the services. So do those providing the services. For example, one area of concern is the estimated cost to the provider of providing services, which is distinct from the price that a customer or client will pay for receiving the services. Such estimation can be very difficult, for complex business scenarios with many variables. This is true of business transformation outsourcing, for example. "Business transformation outsourcing" (BTO) refers to arrangements where a service provider assumes responsibility for performing one or more business processes. This typically includes changing the business process through information technology. This may include a core business process.

These arrangements may involve multiple alternatives, affecting many employees and business partners, or affecting many computers, networks and software applications, for example. Thus these arrangements are difficult to evaluate. This problem is not addressed by known simulation technology. There are simulators of business processes, but they do not show the impact of business transformation outsourcing with various alternatives.

Thus there is a need for computer simulation, that shows the effects of various conditions and decisions, pertaining to business transformation outsourcing services such as purchasing commodities and paying invoices.

SUMMARY OF THE INVENTION

An example of a solution to problems mentioned above comprises: performing a spending simulation, process simulation, information technology simulation, and value simulation, providing interactions among the simulations, and representing with the simulations the use by a client organization of one or more business transformation outsourcing services, such as sourcing, procurement, and payables.

BRIEF DESCRIPTION OF THE DRAWINGS

A better understanding of the present invention can be obtained when the following detailed description is considered in conjunction with the following drawings. The use of the same reference symbols in different drawings indicates similar or identical items.

DETAILED DESCRIPTION

The examples that follow involve the use of one or more computers and may involve the use of one or more communications networks. The present invention is not limited as to the type of computer on which it runs, and not limited as to the type of network used.

The following are definitions of terms used in the description of the present invention and in the claims:

"Application" means any specific use for computer technology, or any software that allows a specific use for computer technology.

"Benefits input" means any data utilized in computing measurements regarding economic benefit.

"Benefits simulation" means any simulation regarding economic benefits.

"Business process" means any function performed by any enterprise, group, or organization; the function may involve providing goods or services of any kind, or may involve internal matters. The function may include, but is not limited to, sourcing, procurement, payables, human resources, customer relationship management, shipping, finance, and accounting.

"Business transformation outsourcing service" means any arrangement where a service provider assumes responsibility for performing one or more business processes. This may include changing the business process through information technology. This may include a core business process, but it is more likely that clients will outsource non-core business processes, since this allows them to focus on their remaining core processes.

"Business transformation outsourcing" (BTO) is a broader term than "business process outsourcing," which implies lower labor rates for performing a non-core business process.

"Client-server application" means any application involving a client that utilizes a service, and a server that provides a service. Examples of such a service include but are not limited to: information services, transactional services, access to databases, and access to audio or video content.

"Comparing" means bringing together for the purpose of finding any likeness or difference, including a qualitative or quantitative likeness or difference.

"Component" means any element or part, and may include elements consisting of hardware or software or both.

"Computer-usable medium" means any carrier wave, signal or transmission facility for communication with computers, and any kind of computer memory, such as floppy disks, hard disks, Random Access Memory (RAM), Read Only Memory (ROM), CD-ROM, flash ROM, non-volatile ROM, and non-volatile memory.

"Cost-benefit assessment" means any comparison or evaluation involving costs and benefits.

"Information technology input" means any data utilized in computing measurements regarding the use of information technology.

"Information technology simulation" means any simulation regarding the use of information technology.

"Mapped" or "Mapping" refers to associating, matching or correlating.

"Measuring" means evaluating or quantifying; the result may be called a "Measure" or "Measurement".

"Output" or "Outputting" means producing, transmitting, or turning out in some manner, including but not limited to printing on paper, or displaying on a screen, writing to a disk, or using an audio device.

"Process input" means any data utilized in computing measurements regarding a business process.

"Process simulation" means any simulation regarding a business process.

"Project" means any assignment, enterprise, job, undertaking or venture, in any industry or profession; for example, it may involve providing services, or a mixture of goods and services.

"Sourcing" means finding and utilizing preferred suppliers.

"Spending input" means any data utilized in computing measurements regarding spending.

"Spending simulation" means any simulation regarding spending.

"State" means any set of stored data at some point in time.

"Storing" data or information, using a computer, means placing the data or information, for any length of time, in any kind of computer memory, such as floppy disks, hard disks, Random Access Memory (RAM), Read Only Memory (ROM), CD-ROM, flash ROM, non-volatile ROM, and non-volatile memory.

"Value input" means any data utilized in computing measurements regarding economic impact.

"Value simulation" means any simulation regarding economic impact.

Figure 1:
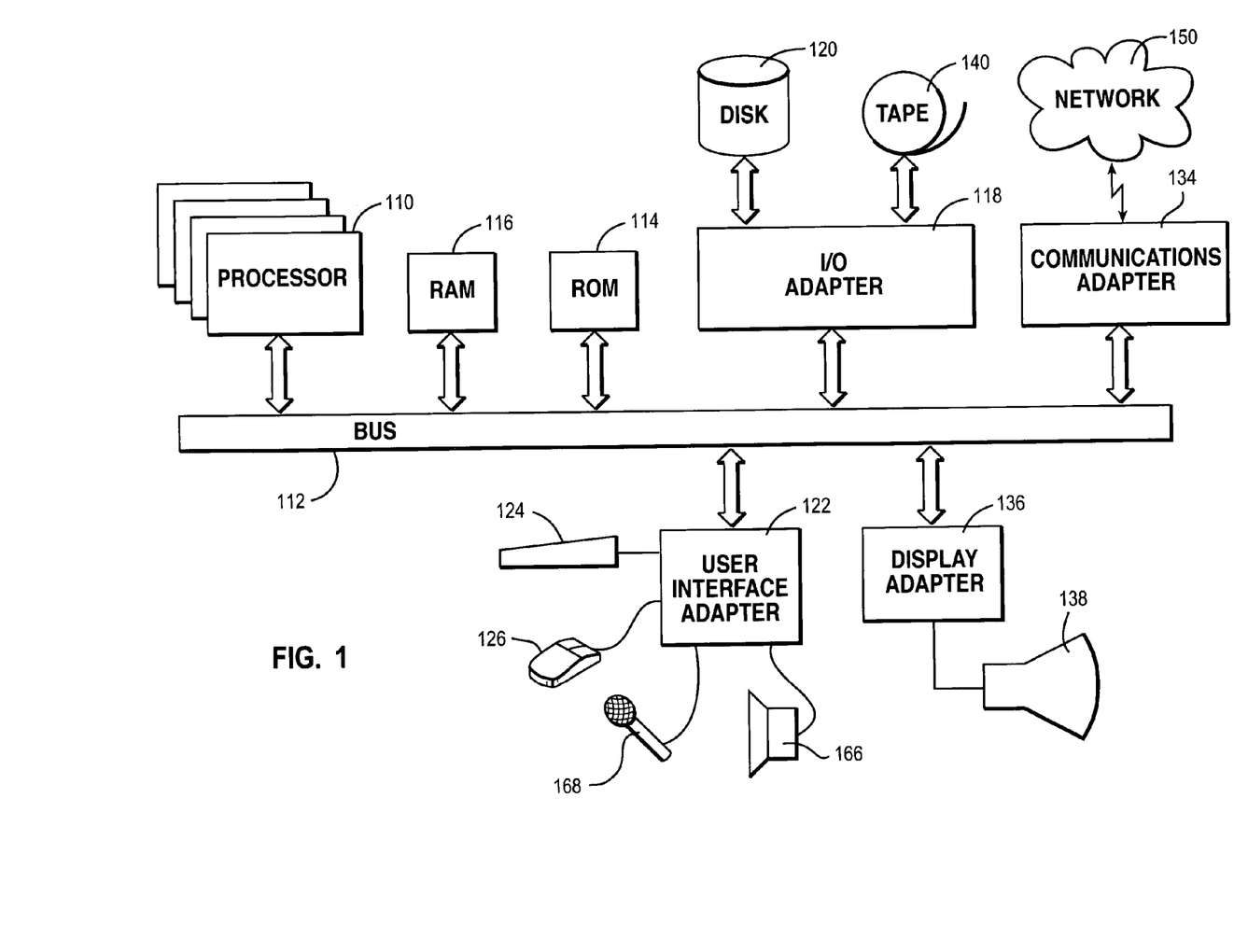
FIG. 1 illustrates a simplified example of a computer system capable of performing the present invention.

FIG. 1 illustrates a simplified example of an information handling system that may be used to practice the present invention. The invention may be implemented on a variety of hardware platforms, including embedded systems, personal computers, workstations, servers, and mainframes. The computer system of FIG. 1 has at least one processor 110. Processor 110 is interconnected via system bus 112 to random access memory (RAM) 116, read only memory (ROM) 114, and input/output (I/O) adapter 118 for connecting peripheral devices such as disk unit 120 and tape drive 140 to bus 112. The system has user interface adapter 122 for connecting keyboard 124, mouse 126, or other user interface devices such as audio output device 166 and audio input device 168 to bus 112. The system has communication adapter 134 for connecting the information handling system to a communications network 150, and display adapter 136 for connecting bus 112 to display device 138. Communication adapter 134 may link the system depicted in FIG. 1 with hundreds or even thousands of similar systems, or other devices, such as remote printers, remote servers, or remote storage units. The system depicted in FIG. 1 may be linked to both local area networks (sometimes referred to as intranets) and wide area networks, such as the Internet.

While the computer system described in FIG. 1 is capable of executing the processes described herein, this computer system is simply one example of a computer system. Those skilled in the art will appreciate that many other computer system designs are capable of performing the processes described herein.

Figure 2:
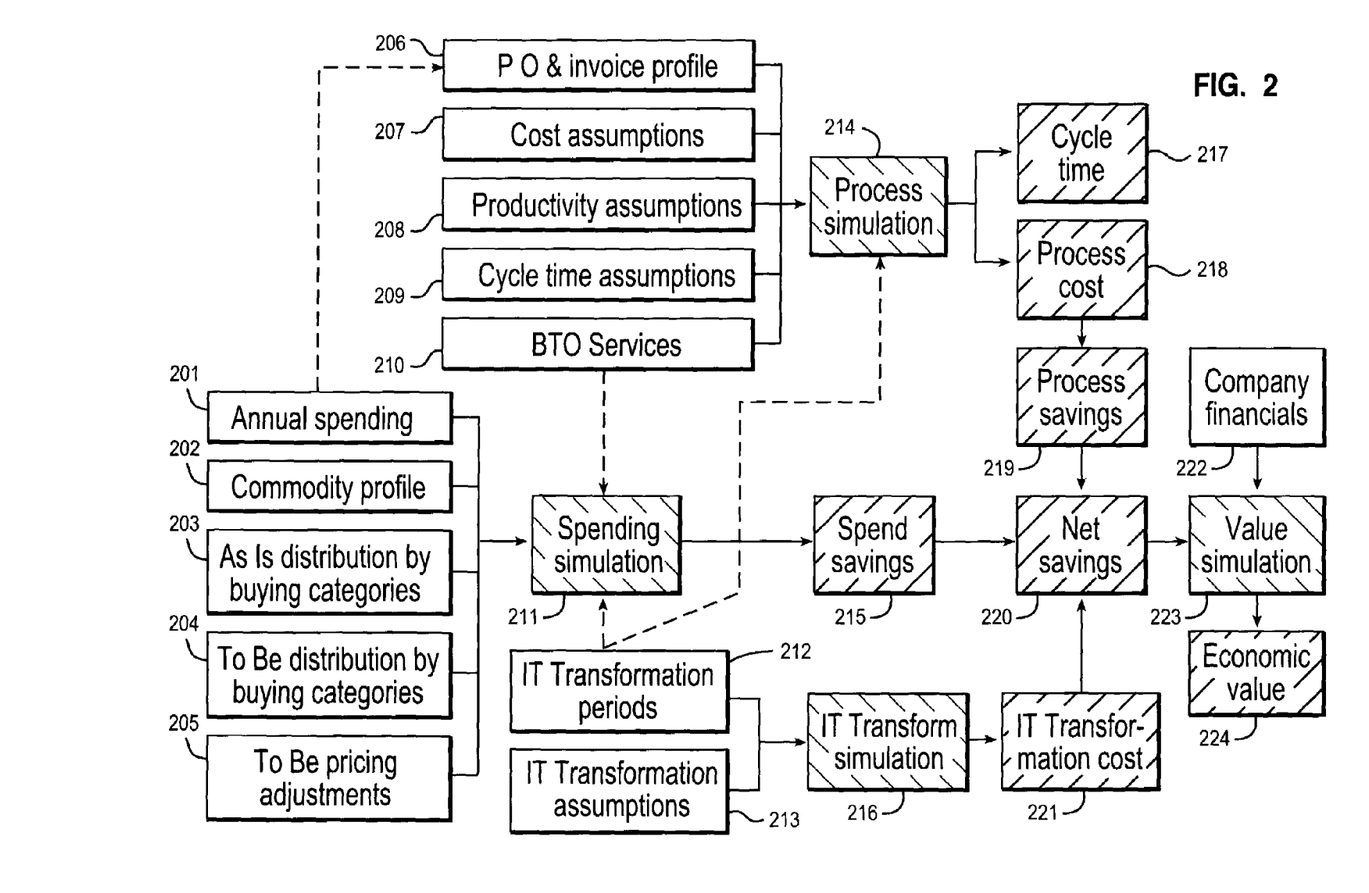
FIG. 2 is a block diagram illustrating an example of simulation of Business Transformation Outsourcing services, including sourcing, procurement, and payables.

FIG. 2 is a block diagram illustrating an example of simulation of Business Transformation Outsourcing services, including sourcing, procurement, and payables. Beginning with an overview, this example involves Business Transformation Outsourcing (BTO) deals (i.e. deals involving outsourcing of business processes, where the business processes may be substantially changed, often through information technology [IT]). BTO simulation may be used to demonstrate, or estimate, benefits and costs of proposed outsourcing deals. A service provider may use BTO simulation to develop and revise proposals to a prospective client organization. A service provider may use BTO simulation during the course of an engagement with a client organization, to adjust to new scenarios.

Continuing with an overview of this example in FIG. 2, Business Transformation Outsourcing simulation generally comprises four interlocking simulations: Benefits (spending 211 in this example), Process (simulation 214), IT (IT transformation simulation 216), and Value (simulation 223). The Benefits (spending 211 in this example) simulation shows how BTO could generate business benefits for the client over a multi-year horizon. (Each BTO service has different benefits.) The Process simulation 214 and IT transformation simulation 216 show how mature processes, skilled staff, and innovative technology enable those benefits. Finally, the Value simulation 223 shows the potential impact of all the foregoing on the client firm's market valuation and share price, for example.

This example in FIG. 2 shows one species of simulation, which simulates particular BTO services: Sourcing, Procurement, and Payables. The general thrust here is moving the client organization toward purchasing goods from preferred sources, and toward more automated practices for purchasing goods and paying invoices. This simulation inherits the general characteristics of Business Transformation Outsourcing simulation, described above. Sourcing, Procurement, and Payables services can be simulated in any combination.

This example in FIG. 2 shows the effects over time of various conditions and decisions (e.g. see blocks numbered 201-210) pertaining to Business Transformation Outsourcing (BTO) of sourcing, procurement, and payables. This example involves simulating business cases (i.e., the connection between BTO services and their impact on the economic value of the client firm, shown by block 224, "Economic value"). This example involves interlocking simulations (i.e., providing interactions among simulations, shown by arrows). For instance, outputs from Spending simulation 211, Process simulation 214, and IT transformation simulation 216 provide input to Value simulation 223, via net savings, block 220.

This example in FIG. 2 involves performing a spending simulation (block 211). Spending is simulated as it is today, and as it could be (shown by block 203, "as is," and block 204, "to be"), subject to various assumptions and alternatives, including adoption of IT (shown by block 213, "IT Transformation assumptions"), and pricing discounts from preferred sources (shown by block 205, "to be pricing adjustments"). For example, by strategically sourcing (buying from preferred sources) commodities that have not been sourced before, substantial pricing discounts may be possible. Likewise, procuring and paying for commodities via automated systems may be significantly faster and less costly than performing these processes manually. Thoroughly analyzing the effects of these and other alternatives over a multi-commodity, multi-year, multi-site deal is something that cannot be done without BTO simulation. BTO simulation makes what would otherwise be an unsolvable problem solvable.

Turning now to some details of this example in FIG. 2, consider Spending simulation 211—(Simulations are numbered for reference, but a change in one is automatically reflected in all the others, if applicable.) The client organization's total spending is simulated as it is today (the "As Is" view) and as it could be (the "To Be" view), subject to an assortment of assumptions and alternatives, including adoption of information technology (such as on-line catalogs and electronic settlement) and pricing discounts due to strategic sourcing.

The Spending simulation (block 211) is based on Subcommodity Profiles (see block 202, "commodity profile"). A subcommodity is an instance within a commodity family. For example, "computer equipment" and "computer software" are subcommodities within the "information technology (IT)" commodity family. Variation in Consumption represents an exogenous constraint (i.e., the amount of a particular subcommodity that a client must buy depends strongly on external factors, such as sales to that client's customers). Variation in Compliance with standard processes represents policy constraints. The amount of business benefit that a client can attain depends strongly on compliance, because non-compliant buying is more likely to be at higher prices, and/or with less favorable terms & conditions.

Spending inputs to spending simulation 211 are shown by block 201, "annual spending," block 202, "commodity profile," block 203, "as is distribution by buying categories," block 204, "to be distribution by buying categories," and block 205, "to be pricing adjustments." The spending simulation 211 computes the amount of spending by commodity and by buying channel for each period, subject to the status of each period (As Is, Transition, or To Be) as well as changes in consumption, commodity pricing, and degree of compliance with the standard process. "Buying channels" are procurement alternatives that include buying via (1) catalogs, (2) contracts, (3) tactical buyers, or (4) non-compliance. Channels #1 and #2 can be highly automated. Channel #3 is a manual alternative that applies when an automated alternative is not available for a particular item. Channel #4 occurs when the client's employees or agents purchase items themselves rather than using one of the other, standard channels. The As Is view is the distribution of spending across these channels today. Typically, 70% or more of As Is spending is non-compliant. The To Be view is the distribution expected after the BTO transition is complete. Typical To Be compliance is about 80%, but compliance over 95% is possible. (Non-compliant spending costs more because pricing discounts cannot be achieved.) Using the first As Is period as a baseline, spend savings is computed for each period and cumulatively to the simulation horizon.

Consider an example of output from spending simulation 211. Results may be presented in a spreadsheet, with a row for each month, from Month 1 of Year 1, to the simulation horizon. Each month has a status label (As Is, Transition, or To Be). Spending savings (block 215) may be represented by a column for monthly spending savings, and a column for cumulative spending savings. Non-zero values may begin to appear in columns for spending savings, in the first transition month.

Process simulation 214—A flow model shows how transactions flow through the subprocesses underlying sourcing, procurement, and payables. The rate at which information technology and lower-cost resources are substituted for the old way of performing the business process affects how many transactions there are, where they flow, and what they each cost to process.

Process inputs for process simulation 214 are shown by "PO & invoice profile," block 206, "cost assumptions" 207, "productivity assumptions" 208, "cycle time assumptions" 209, and "BTO services" 210. The process simulation 214 computes the number of transactions (purchase orders [PO's], invoices, calls) during each period, subject to the status of each period (As Is, Transition, or To Be) as well as changes in consumption and degree of compliance with the standard process. (Non-compliant transactions cost more because they cannot be automated.) In this example, business process simulation 214 is a flow model, not a queuing model. It shows how many transactions flow through each business process during each period, but does not simulate the processing of each individual transaction. Process cost per period by service (e.g. Sourcing, Procurement, Payables) is computed from resource costs, adjusted for transaction volumes. Cost per PO and invoice per period are computed as total costs divided by number of transactions.

IT transformation simulation 216—The tasks needed to design, build, implement, and operate the new information technology (and retire old IT) are simulated. IT inputs for IT transformation simulation 216 are shown by "IT Transformation periods," block 212 and "IT Transformation assumptions," 213. The IT transformation simulation 216 computes the transformation cost per period by phase using IT resource costs and expenses, subject to the schedule. Phases can be serial, overlapping, or concurrent. They tend to be serial when the scope of work can be decomposed into independent releases. They tend to be overlapping or concurrent when the same work must be accomplished at multiple locations.

Consider an example of output from IT transformation simulation 216. Results (IT transformation cost 221) may be presented in a spreadsheet, with a row for each month, from Month 1 of Year 1, to the simulation horizon. Columns may show costs to design, build, implement, and operate the new information technology. In the early months, non-zero values may be seen only in the columns showing costs to design, build, and implement. Non-zero values may begin to appear in a column for operation cost after the new information technology is designed, built, and implemented.

Value simulation 223—The effects of net savings (Block 220), from the previous simulations, on the client organization's financial position are simulated. So are other alternatives with financial impact, such as acquisition of assets in conjunction with BTO. The value simulation 223 computes the impact of the net savings 220 on the client's financial statements, subject to additional financial transactions, such as asset acquisition or financing of fees. (Net savings 220, Company financials 222, and any additional financial transactions are value inputs to value simulation 223.) The connection between BTO services and their impact on the economic value of the client organization is symbolized by block 224, "Economic value." This involves outputting one or more measures of economic value (a client's view of how BTO will affect the client organization). When the client's cost of capital is considered, the economic value of net savings 220 from Business Transformation Outsourcing can be substantial.

Continuing with some details of this example in FIG. 2, inputs, simulations, and outputs are further described below. Annual spending 201 drives the spending simulation 211. In other words, Annual spending 201 is an input that is a major determinant of values computed by the spending simulation 211. Regarding commodity profile 202, selection of an industry template pre-populates a set of commodities appropriate to that industry. The commodity profile 202 includes typical transaction size (used later to compute the number of purchase orders (PO's), invoices, and calls that a given amount of annual spending generates), the portion of transactions that can be processed automatically versus manually, and the number of PO's that generate spending over multiple years.

Block 203, "As Is," and block 204, "To Be" describe how much buying the client does today ("As Is") through its standard process, if any, versus how much it will do later ("To Be") through the service provider's standard automated process. "To Be pricing adjustments" 205 represents the discount obtained via strategic sourcing if that service is in scope.

Regarding BTO services 210, the scope of services determines which business processes a BTO service provider will perform for the client organization. Regarding block 208, buyer productivity rates are the number of PO's a buyer can handle per day for each commodity, which is used to compute the number of buyers needed. Cost assumptions inputs 207 define the human resources needed to perform the business processes today ("As Is") and during outsourcing ("To Be"). The number of full-time equivalent (FTE) resources the client uses today, plus their cost rates by location, are entered. Inputs 212 and 213 define the information technology (IT) resources needed to achieve the transformation from "As Is" to "To Be" processes.

Company financials 222 preferably includes the client organization's balance sheet and income statement, along with any BTO service provider's financial transactions, such as asset acquisition or financing of fees.

Regarding output of net savings, block 220, one example of output from the simulations is an executive summary of the simulations, which (1) computes the net savings used in the value simulation 223 and (2) summarizes the results of all the simulations. Spend savings plus process savings, minus IT transform cost, equals net savings. This may involve outputting cost quantities and benefit quantities for a number of years. (See also FIG. 5.)

Figure 3A:
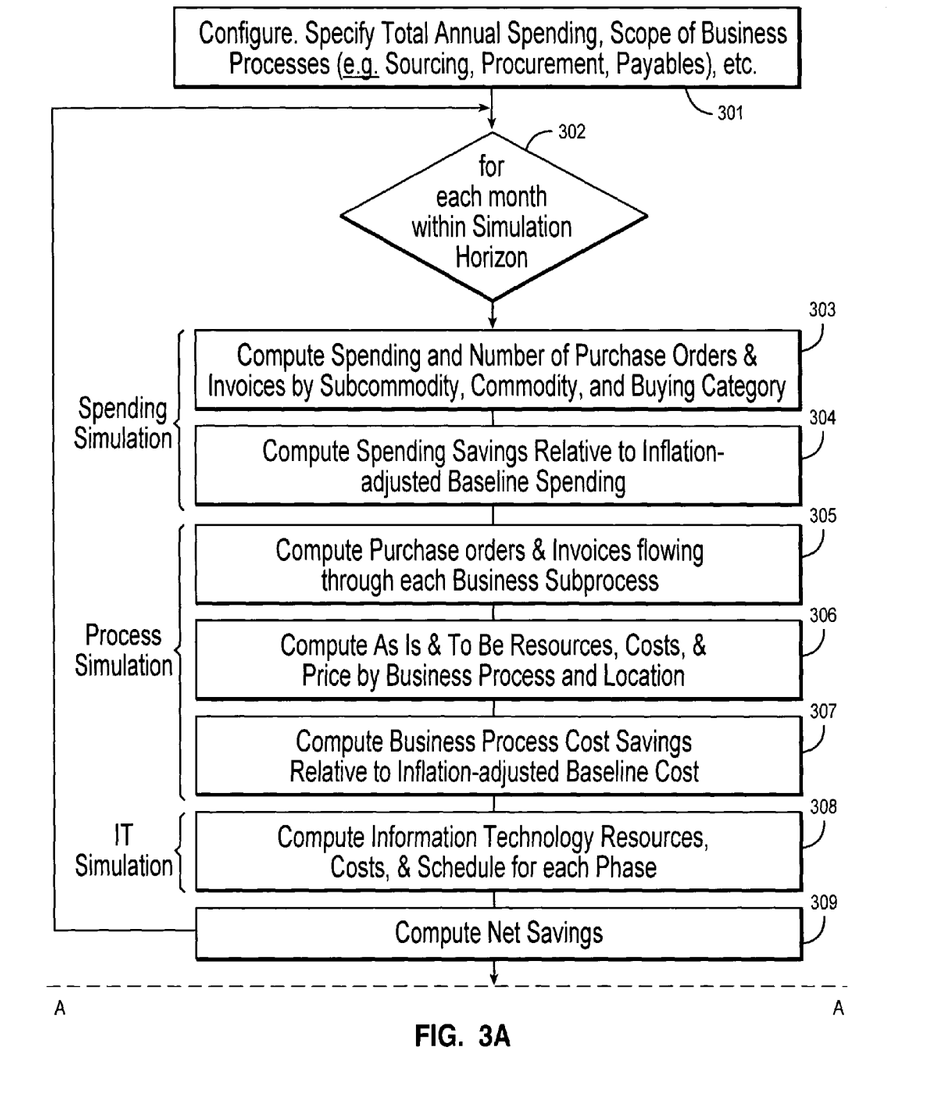
FIGS. 3A and 3B make up a flow chart, illustrating an example of a BTO simulation process.
Figure 3B:
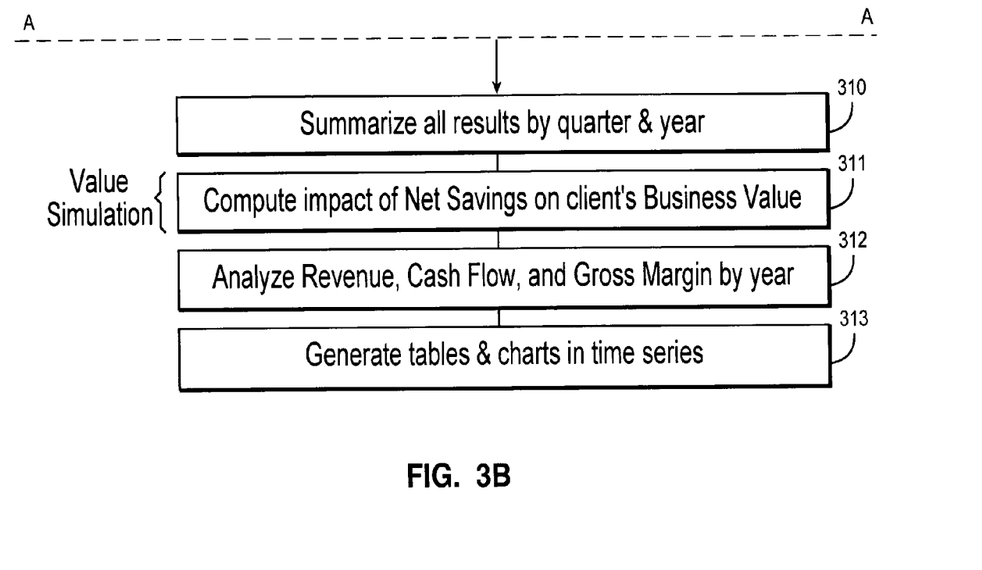

FIGS. 3A and 3B make up a flow chart, illustrating an example of a BTO simulation process. To begin with an overview, Block 301, configuration, represents creation of a model, and establishing the model's initial state. Blocks 303-309 represent next-step functions that change the model's state to represent the next month in a period to be simulated. Then the process enters block 310, to summarize results. In this example, all the simulations are discrete rather than continuous. The simulations do not embody optimization models. BTO engagements are far too complex overall to apply any familiar optimization algorithm. Indeed this is the principal reason for using simulations rather than analytical models to build business cases.

This example begins with block 301, configuration. Here is a list of items preferably involved in configuration:
Total Annual Spending
Scope of services (Business Processes such as Sourcing, Procurement, Payables)
Options: Travel and Entertainment Commodities, Data Warehousing, etc.
Schedule: Simulation Horizon, Design and Build+Implementation+Operation Phases
Subcommodity Profiles from Industry Templates:
  Parent Commodity
  Percent of Total Annual Spending
  Average Transaction Amount
  Changes in Consumption Levels
  Buying Categories: Catalog, Contract, Buyer, Non-compliant
  Expected Commodity Price Reductions due to Strategic Sourcing
  Settlement Categories: Manual vs. Automated
  Software Requirements: Customer-licensed vs. Outsourced
  Demand Patterns: Trend, Business Cycles, Seasons, Random Variability
  Inflation
  Pricing Model for Outsourcing
  Output Resolution: Monthly, Quarterly, Yearly Next, consider some details of configuration and inputs represented by block 301. Input stages are presented in order, as they are typically done initially, but inputs can be modified in any order, and all the affected outputs are automatically recomputed. The first input is to a configurator that sets up the simulations. Annual spending drives the spending simulation. The scope of services determines which business processes a BTO service provider will perform for the client. Service options are additional products and services that could be provided in support of those business processes. The simulation horizon determines the number of years of simulated time the simulations will cover. A subcommodity is an instance within a commodity family. Selection of an industry template pre-populates a set of commodities appropriate to that industry.

Output formatting controls the amount of detail in outputs: (1) monthly, quarterly, or yearly summaries and (2) commodity-level details. Schedule inputs control (1) the number of IT implementation phases and the amount of work done in each and (2) when the transition from the As Is to To Be processes will occur. Data prepared by the configurator includes commodities and schedule parameters. Finally, inputs to and data from the configurator can be displayed or printed.

Continuing with some details represented by block 301, the next set of inputs modify and extend the commodities with data about the client organization (i.e., a BTO service provider's customer). Some customers buy commodities that are not in the standard industry template, so the commodities set itself is editable. Active services can be taken out of scope for specific commodities. The commodity profile includes typical transaction size (used later to compute the number of purchase orders (POs), invoices, and calls that a given amount of annual spending generates), the portion of transactions that can be processed automatically versus manually, and the number of POs that generate spending over multiple years. Buyer productivity rates are the number of POs a buyer can handle per day for each commodity, which is used to compute the number of buyers needed. Consumption is the decrease in spending that will result from having a standard process or increase in spending that will result from growth in the client organization's business. Commodity pricing is the discount obtained via strategic sourcing if that service is in scope. Settlement channels describe how much payment the client organization does manually today versus how much will be automated via the BTO service provider standard process. Data prepared by this input stage includes (1) the number of As Is versus To Be transactions and (2) the number of buyers needed to support those transactions. Finally, inputs to and data from this input stage can be displayed or printed.

The next set of inputs define the human resources needed to perform the business processes today ("As Is") and during outsourcing ("To Be"). The number of full-time equivalent (FTE) resources the client organization uses today, plus their cost rates by location, are entered. Since client organizations may have resource types that are not in the standard set, the resource types set is editable.

The next set of inputs define the information technology (IT) resources needed to achieve the transformation from As Is to To Be processes. The next set of inputs define non-labor expenses. The non-labor expense types set is editable. For each non-labor expense type, the number of occurrences of an appropriate expense driver is multiplied by the corresponding expense rate. The last set of inputs includes the client organization's balance sheet and income statement, along with any BTO service provider financial transactions, such as asset acquisition or financing of fees.

Decision 302 is at the top of a loop, representing repetition of blocks 303-309 for each month, from Month 1 of Year 1, to the simulation horizon. In other words, the text in 302 could ask: "Repeat for next month within simulation horizon?" The "Yes" branch will be taken to repeat blocks 303-309, until each month in a period to be simulated has been covered. Then the process enters block 310, to summarize results.

Blocks 303-304 represent operations included in the spending simulation, discussed above in connection with FIG. 2. Block 303 represents computing spending and number of purchase orders and invoices by subcommodity, commodity, and buying category. Parameters are: Subcommodity Profiles, Demand Patterns, and Inflation. (Parameters mentioned in this example are data values incorporated in the simulator rather than input by users.)

Block 304 represents computing spending savings relative to inflation-adjusted baseline spending. Blocks 305-307 represent operations included in the process simulation, discussed above in connection with FIG. 2. Block 305 represents computing purchase orders and invoices flowing through each business subprocess. Parameters are: Cost Rates by Location for BTO service provider, Non-labor Expenses, Resource Counts and Productivity Rates by Resource Types and Location.

Block 306 represents computing As Is and To Be resources, costs, and price by business process and location. The number of BTO service provider buyers needed was pre-computed during a previous input stage. The number of other BTO service provider resources needed is computed by (1) entering an appropriate FTE driver for each resource type, (2) looking up the number of occurrences of each driver, and (3) dividing the number of occurrences by a conversion factor. The resulting resource counts are then multiplied times the cost rate for each FTE's location to get As Is and To Be resource costs. (Selecting the right mix of on-site, on-shore, and off-shore resources is involved in achieving service level agreements at a competitive price.) Block 307 represents computing business process cost savings relative to inflation-adjusted baseline cost.

Block 308 represents operations included in the IT simulation. (See the discussion of IT transformation simulation 216 above in connection with FIG. 2.) Block 308 represents computing information technology resources, costs, and schedule for each phase. Parameters are: Cost Rates by Location, Non-labor Expenses, Resource Counts and Productivity Rates by Resource Types and Location. IT resources are computed separately from non-IT resources because (1) there are no As Is resources to simulate and (2) some IT resources are needed for only a limited time, whereas non-IT resources are needed for the entire simulation. The IT resource type set is editable to accommodate special needs. For each resource type, the number of occurrences of an appropriate driver is divided by a conversion factor that yields work effort. The total work effort for finite-time activities (Design and Build and Implementation) and schedule parameters are used to compute the schedule. The schedule recognizes that completion of the finite-time activities initiates the on-going IT activities (operation and maintenance). The FTE's needed to meet that schedule are computed. Resource counts are multiplied by cost rate for each FTE's location to get IT resource costs.

Block 309 represents computing Net Savings. Block 310 represents summarizing all results by quarter and year. This may involve outputting cost quantities and benefit quantities for a number of years. (See also FIG. 5.)

Block 311 represents operations included in the value simulation. (See the discussion of value simulation 223 above, in connection with FIG. 2.) Block 311 represents computing impact of net savings on client's business value. Parameters are: Client Financial Statements, Adjustments for industry and geographic comparability.

Block 312 represents analyzing revenue, cash flow, and gross margin by year. Parameters are: Gross Margin and Contingency, Base and Percent of Spending.

Block 313 represents generating tables and charts in time series. This involves outputting one or more measures of economic value for the business transformation outsourcing service.

Regarding FIG. 3, the order of the operations described above may be varied. For example, it is within the practice of the invention for the spending simulation, process simulation, and IT simulation to occur simultaneously. Blocks in FIG. 3 could be arranged in a somewhat different order, but still describe the invention. Blocks could be added to the above-mentioned diagram to describe details, or optional features; some blocks could be subtracted to show a simplified example.

Figure 4A:
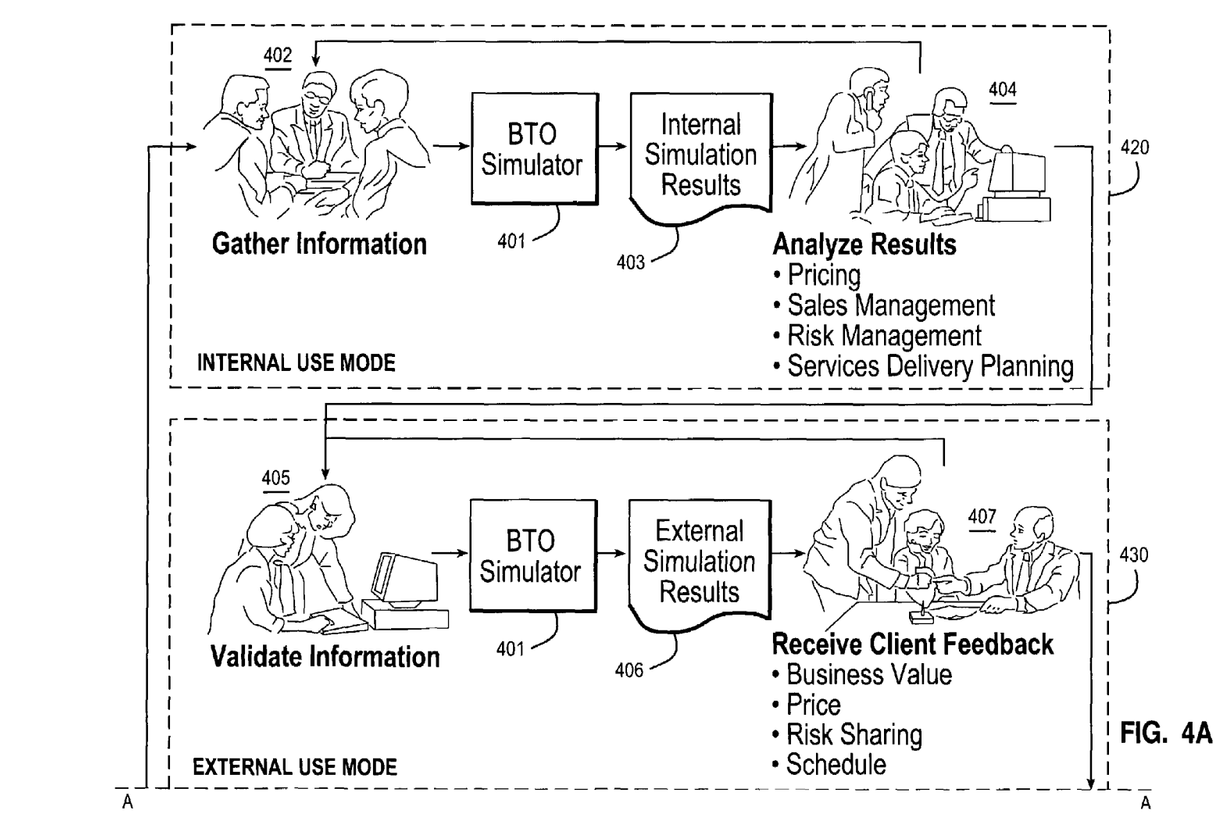
FIGS. 4A and 4B make up a block diagram, illustrating an example of systems and methods of simulation, including different modes for different end-users.
Figure 4B:
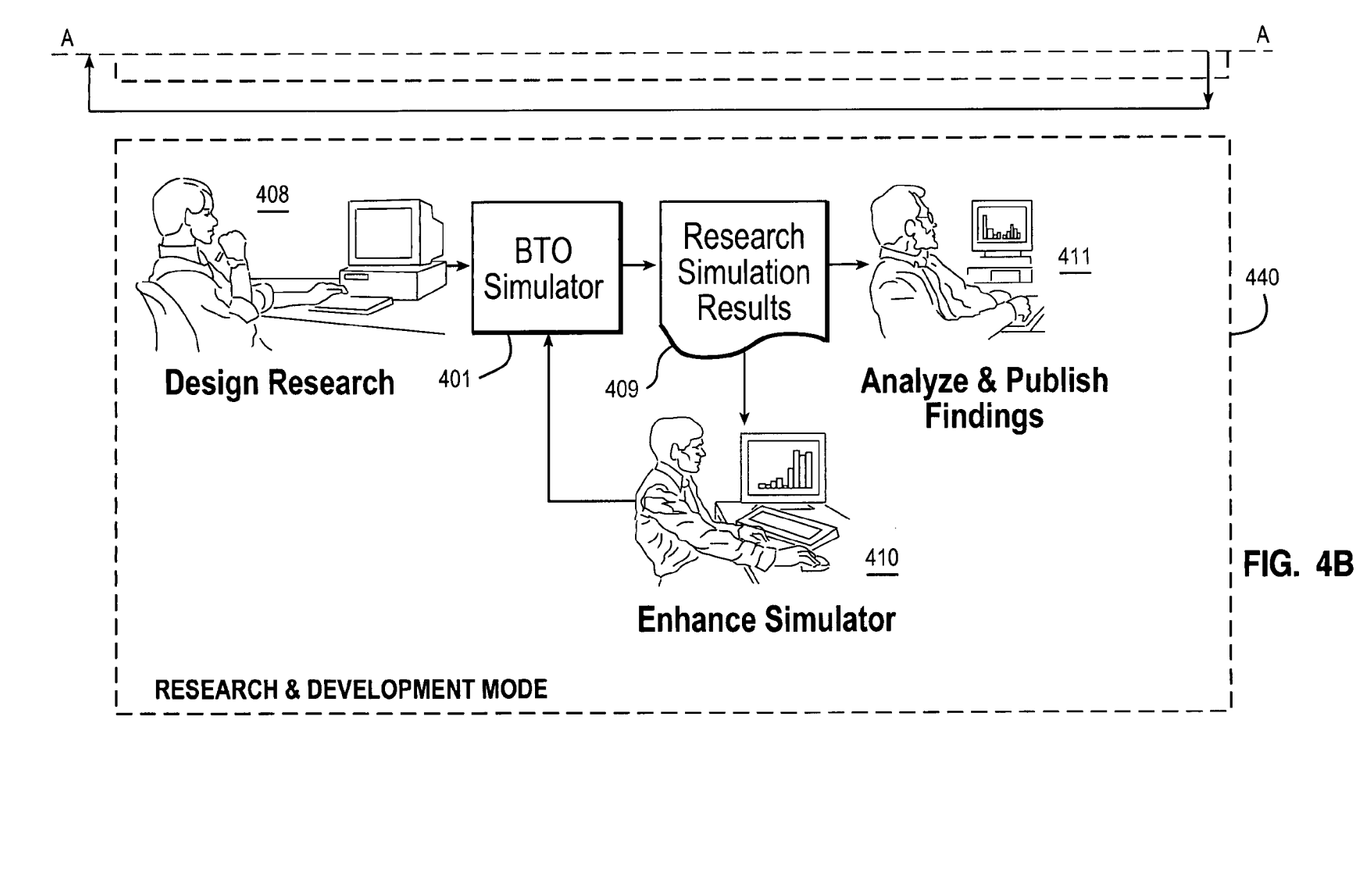

FIGS. 4A and 4B make up a block diagram, illustrating an example of systems and methods of simulation, including different modes for different end-users. This example in FIGS. 4A and 4B involves representing with simulations the use by a client organization of one or more business transformation outsourcing services, such as sourcing, procurement, and payables. This example involves performing one or more simulations, such as: a simulation in research and development mode, block 440, a simulation in internal use mode, block 420, and a simulation in external use mode, block 430. These modes are named from the BTO service provider's point of view, so internal use mode, block 420, is suitable for the BTO service provider's internal purposes. Internal purposes include pricing, sales management, risk management, and services delivery planning, for a BTO services arrangement (see block 404). External use mode, block 430, is suitable for the BTO service provider's dealings with a client organization.

Inputs for External use (block 405), are a subset of those for Internal use (block 402), which are in turn a subset of inputs for Research & Development use (block 408). Outputs have the same hierarchical subset relationship. External (block 406), is a subset of Internal (block 403), and Internal is a subset of R&D (block 409). When run for clients (block 430), the simulations are deterministic. When the simulator is run without any random variability, its results are deterministic (which means the same inputs always generate the same output). This repeatability is helpful in conversations with client organizations. But when run for internal research purposes (block 440), and risk management (block 420), random variability can be injected and the simulations run many times to quantify expected values. When the simulator is run with random variability in selected variables, its results are stochastic (which means the same inputs generate somewhat different output). These variations are helpful during research (block 440) because multiple simulation runs can be analyzed statistically.

Block 420 symbolizes conducting simulations in internal use mode, typically by a provider of BTO services. At block at 402, information is gathered about a proposed BTO deal, and inputs are provided to BTO simulator 401. Simulations are run at block 401, producing internal simulation results at block 403. Actions taken at block 404 include analyzing results, serving purposes such as: pricing, sales management, risk management, and services delivery planning. A result of information received at block 404 may be feedback to the model at block 402, symbolized by the arrow connecting block 404 and block 402.

Regarding external use mode, within block 430, actions taken at block 407 include receiving client feedback, on topics such as business value, price, risk sharing, and schedule. A result of information received at block 407 may be feedback to the model at block 402, for internal use, symbolized by the downward-looping arrow connecting block 407 and block 402. There also may be feedback to the model at block 405, for adjustment purposes, symbolized by the arrow connecting block 407 and block 405.

In the research and development mode, shown in block 440, research projects are designed at block 408, and BTO simulations run at block 401. There may be feedback for purposes of improving or enhancing BTO simulator 401, symbolized by arrows connecting block 409, block 410 and block 401, shown inside block 440. Based upon research simulation results at block 409, findings are analyzed and published, at block 411.

The computers, and communications among computers and people, shown in blocks 420, 430, and 440, may serve as means for performing simulations in different modes for different end-users. BTO simulator 401, shown in blocks 420, 430, and 440, may be implemented with software running on one computer, or on different computers that communicate via a network, for example. Inputs may come directly from users at 402, 405, or 408, or from another source, such as stored data for a project. A computer at block 402, 405, or 408 may serve as means for receiving inputs. A computer at block 401, running simulations, may serve as a means of responding to said inputs, for performing simulations. A computer at block 404, 407, or 411, or a printed document, may serve as means for outputting results such as measures of economic value.

Figure 5:
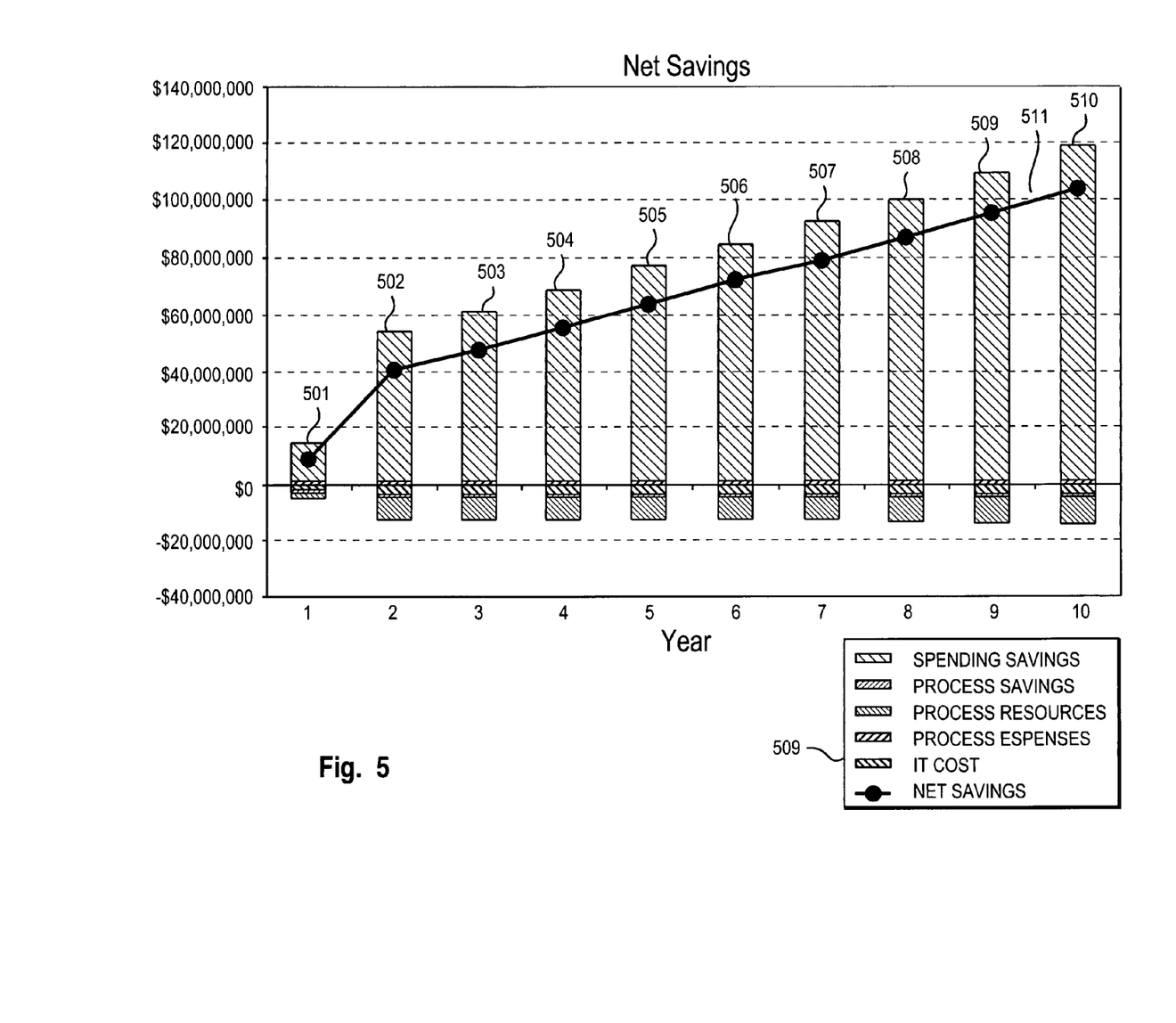
FIG. 5 is a diagram illustrating one example of output from simulations, according to the teachings of the present invention.

FIG. 5 is a diagram illustrating one example of output from simulations, according to the teachings of the present invention. FIG. 5 shows an example of outputting cost quantities and benefit quantities for a number of years, as a bar graph. Each bar, numbered 501-510, represents one year in a 10-year period that is simulated for a client organization. Each bar, numbered 501-510, represents cost quantities and benefit quantities for a particular year. As shown in the legend in box 509, benefit quantities include spending savings, process savings, and net savings. Net savings is the benefit quantity represented by line 511. Cost quantities include process resources, process expenses, and Information Technology cost Within each bar, numbered 501-510: spending savings+ plus process savings−process resources−process expenses− IT cost=net savings. This is a variation of the general formula mentioned in connection with FIG. 2: spending savings+ process savings−IT cost=net savings.

This final portion of the detailed description presents a few details of an example implementation, that simulated particular BTO services: sourcing, procurement, and payables. Output similar to FIG. 5 was produced, for example. A simulator was implemented with software capable of running on a desktop computer or laptop computer. The simulator had a familiar, spreadsheet-style user interface.

Other hardware and software could be used. A simulator could be implemented by using object-oriented programming with the JAVA programming language and database-management software, for example. A simulator could be implemented as a client-server application for example. Another possibility would be to implement it as a web service (i.e., a computer application executable over an intranet or the Internet).

In conclusion, we have shown examples of computer simulation, that shows the effects of various conditions and decisions, pertaining to business transformation outsourcing services such as purchasing commodities and paying invoices.

One of the possible implementations of the invention is an application, namely a set of instructions (program code) executed by a processor of a computer from a computer-usable medium such as a memory of a computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer-usable medium having computer-executable instructions for use in a computer. In addition, although the various methods described are conveniently implemented in a general-purpose computer selectively activated or reconfigured by software, one of ordinary skill in the art would also recognize that such methods may be carried out in hardware, in firmware, or in more specialized apparatus constructed to perform the method.

While the invention has been shown and described with reference to particular embodiments thereof, it will be understood by those skilled in the art that the foregoing and other changes in form and detail may be made therein without departing from the spirit and scope of the invention. The appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the appended claims may contain the introductory phrases "at least one" or "one or more" to introduce claim elements. However, the use of such phrases should not be construed to imply that the introduction of a claim element by indefinite articles such as "a" or "an" limits any particular claim containing such introduced claim element to inventions containing only one such element, even when the same claim includes the introductory phrases "at least one" or "one or more" and indefinite articles such as "a" or "an;" the same holds true for the use in the claims of definite articles.

We claim:

1. A method of simulation in a computer, said method comprising:
   receiving, in the computer, for at least one business transformation outsourcing service, spending inputs, process inputs, and information technology inputs;
   based on said inputs, performing, in the computer, a spending simulation, a process simulation, and an information technology simulation;
   computing, in the computer, net savings values, based on said simulations;
   performing a value simulation, in the computer, based on said net savings values; and outputting, by the computer, at least one measure of economic value for said business transformation outsourcing service, wherein:

the spending simulation, process simulation, information technology simulation, and the value simulation have a plurality of periods of simulation, each period having either a current condition under which no outsourcing by the business transformation outsourcing service is performed, a transitional condition in which outsourcing is being put into place, or an outsourcing condition in which outsourcing by the business transformation outsourcing service is performed, and wherein there is at least one period having a current condition, at least one period having a transitional condition, and at least one period having an outsourcing condition, the process simulation, based on the inputs, computes both a number of transactions during each period of simulation, of the plurality of periods of simulation, and a process cost, based on a status of the particular period being under current conditions, transitional conditions, or during outsourcing conditions, the process simulation utilizes a flow model showing how transactions flow through sub-processes, wherein a rate at which information technology is substituted for current processes, represented by a schedule, affects the computation of the number of transactions during a transitional condition period of simulation in the spending simulation, process simulation, and information technology simulation, and the sub-processes through which the transactions flow in the flow model, the information technology simulation simulates, based on the inputs, the tasks needed to design, build, implement, operate, and maintain new information technology to implement the outsourcing, and computes a transformation cost for each period of the simulation, of the plurality of periods of simulation, based on the status of the particular period being under current conditions, transitional conditions, or during outsourcing conditions, an output of the spending simulation, the processing savings, and the information technology transformation costs are combined to identify the net savings values representing a transition from current conditions to outsourcing conditions, the value simulation simulates, based on the net savings and business financial input information, effects of transitioning from current conditions to outsourcing conditions, on a financial position of the business, and the at least one measure of economic value for the business transformation outsourcing service is calculated based on the effects of transitioning from current conditions to outsourcing conditions on the financial position of the business.

2. The method of claim 1, further comprising:

outputting cost quantities and benefit quantities for a plurality of years.

3. The method of claim 1, further comprising:

performing one or more simulations selected from a group consisting of a simulation in research and development mode, a simulation in internal use mode, and a simulation in external use mode.

4. The method of claim 1, wherein said at least one business transformation outsourcing service further comprises one or more business transformation outsourcing services, in any combination, selected from a group consisting of sourcing, procurement, and payables.

5. The method of claim 1, wherein said performing a spending simulation further comprises performing a spending simulation based on sub-commodity profiles.

6. The method of claim 1, further comprising making said net savings values at least partly dependent upon compliance with standard processes.

7. The method of claim 1, further comprising:

receiving, for the at least one business transformation outsourcing service, a selection of an industry template; and pre-populating one or more commodity profiles in the spending simulation based on the selected industry template, wherein each commodity profile in the one or more commodity profiles comprises a typical transaction size and a portion of transactions that can be processed automatically versus manually.

8. The method of claim 1, wherein the spending simulation computes an amount of spending for each buying channel of a plurality of buying channels representing procurement alternatives and wherein the plurality of buying channels comprises at least one buying channel that is automated and at least one buying channel that is manual.

9. A method of simulation in a computer, said method comprising:

performing, in the computer, a spending simulation;

performing, in the computer, a process simulation;

performing, in the computer, an information technology simulation;

performing, in the computer, a value simulation;

providing interactions among said simulations within the computer; and representing with said simulations, by the computer, the use by a client organization of one or more business transformation outsourcing services, in any combination, chosen from sourcing, procurement, and payables, wherein:

the spending simulation, process simulation, information technology simulation, and value simulation have a plurality of periods of simulation, each period having either a current condition under which no outsourcing by the business transformation outsourcing service is performed, a transitional condition in which outsourcing is being put into place, or an outsourcing condition in which outsourcing by the business transformation outsourcing service is performed, and wherein there is at least one period having a current condition, at least one period having a transitional condition, and at least one period having an outsourcing condition, the process simulation computes both a number of transactions during each period of simulation, of the plurality of periods of simulation, and a process cost, based on a status of the particular period being under current conditions, transitional conditions, or during outsourcing conditions, the process simulation utilizes a flow model showing how transactions flow though sub-processes, wherein a rate at which information technology is substituted for current processes, represented by a schedule, affects the computation of the number of transactions during a transitional condition period of simulation in the spending simulation, process simulation, and information technology simulation, and the sub-processes though which the transactions flow in the flow model, the information technology simulation simulates the tasks needed to design, build, implement, operate, and maintain new information technology to implement the outsourcing, and computes a transformation cost for each period of the simulation, of the plurality of periods of simulation, based on the status of the particular period being under current conditions, transitional conditions, or during outsourcing conditions, an output of the spending simulation, the processing savings, and the information technology transformation costs are combined to identify the net savings values representing a transition from current conditions to outsourcing conditions, the value simulation simulates, based on the net savings and business financial input information, effects of transitioning from current conditions to outsourcing conditions, on a financial position of the business, and the at least one measure of economic value for the business transformation outsourcing service is calculated based on the effects of transitioning from current conditions to outsourcing conditions on the financial position of the business.

10. The method of claim 9, further comprising:

receiving for said one or more business transformation outsourcing services spending inputs, process inputs, information technology inputs, and value inputs.

11. The method of claim 9, farther comprising:

outputting cost quantities and benefit quantities for a plurality of years.

12. The method of claim 9, further comprising:

receiving, for the at least one business transformation outsourcing service, a selection of an industry template; and pre-populating one or more commodity profiles in the spending simulation based on the selected industry template, wherein each commodity profile in the one or more commodity profiles comprises a typical transaction size and a portion of transactions that can be processed automatically versus manually.

13. The method of claim 9, wherein the spending simulation computes an amount of spending for each buying channel of a plurality of buying channels representing procurement alternatives and wherein the plurality of buying channels comprises at least one buying channel that is automated and at least one buying channel that is manual.

\* \* \* \* \*